United States Patent
Kang et al.

(10) Patent No.: US 8,469,002 B2
(45) Date of Patent: Jun. 25, 2013

(54) COMBUSTION PHASING CONTROL IN SPARK-ASSISTED HCCI COMBUSTION MODE

(75) Inventors: Jun-Mo Kang, Ann Arbor, MI (US); Hanho Yun, Oakland Township, MI (US); Chen-Fang Chang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 406 days.

(21) Appl. No.: 12/947,729

(22) Filed: Nov. 16, 2010

(65) Prior Publication Data

US 2012/0118267 A1    May 17, 2012

(51) Int. Cl.
*F02P 5/04*    (2006.01)
(52) U.S. Cl.
USPC ............ 123/406.26; 123/406.23; 123/406.24; 701/105
(58) Field of Classification Search
USPC .............. 123/435, 436, 295, 90.15, 345–348, 123/406.23, 406.24, 406.26, 406.41, 406.42; 701/101–105, 108, 110
See application file for complete search history.

(56) References Cited

U.S. PATENT DOCUMENTS

| | | | |
|---|---|---|---|
| 6,994,072 B2 | 2/2006 | Kuo et al. | |
| 7,128,047 B2 | 10/2006 | Kuo et al. | |
| 7,231,906 B1 * | 6/2007 | Haskara et al. | 123/435 |
| 7,469,181 B2 * | 12/2008 | Duffy et al. | 701/108 |
| 7,739,999 B2 * | 6/2010 | Kang et al. | 123/299 |
| 2007/0113821 A1 | 5/2007 | Kang et al. | |

OTHER PUBLICATIONS

U.S. Appl. No. 12/395,747, Kang et al.

* cited by examiner

*Primary Examiner* — Stephen K Cronin
*Assistant Examiner* — Joseph Dallo

(57) ABSTRACT

A method for controlling combustion in a multi-cylinder spark-ignition direct-injection internal combustion engine includes determining a desired combustion phasing for maintaining acceptable combustion properties, monitoring combustion phasing of each cylinder, selecting a target combustion phasing corresponding to one of the cylinders having a most retarded combustion phasing, adjusting spark timing in each cylinder not having the most retarded combustion phasing to achieve the target combustion phasing to balance the combustion phasing in all the cylinders at the target combustion phasing, and adjusting an external EGR percentage to converge the balanced combustion phasing in all the cylinders toward the desired combustion phasing.

15 Claims, 3 Drawing Sheets

COMBUSTION PHASING CONTROL IN SPARK-ASSISTED HCCI COMBUSTION MODE

TECHNICAL FIELD

This disclosure relates to operation and control of homogeneous-charge compression-ignition (HCCI) engines.

BACKGROUND

The statements in this section merely provide background information related to the present disclosure and may not constitute prior art.

Internal combustion engines, especially automotive internal combustion engines, generally fall into one of two categories: spark ignition and compression ignition. Spark ignition engines, such as gasoline engines, introduce a fuel/air mixture into the combustion cylinders, which is then compressed in the compression stroke and ignited by a spark plug. Compression ignition engines, such as diesel engines, introduce or inject pressurized fuel into a combustion cylinder near top dead center (TDC) of the compression stroke, which ignites upon injection. Combustion for both gasoline engines and diesel engines involves premixed or diffusion flames that are controlled by fluid mechanics. Each type of engine has advantages and disadvantages. In general, gasoline engines produce fewer emissions but are less efficient. In general, diesel engines are more efficient but produce more emissions.

More recently, other types of combustion methodologies have been introduced for internal combustion engines. One of these combustion concepts is known in the art as the homogeneous charge compression ignition (HCCI). The HCCI combustion mode includes a distributed, flameless, auto-ignition combustion process that is controlled by oxidation chemistry, rather than by fluid mechanics. In a typical engine operating in HCCI combustion mode, the cylinder charge is nearly homogeneous in composition temperature at intake valve closing time. The typical engine operating in the HCCI combustion mode can further operate using stratified charge fuel injection to control and modify the combustion process, including using stratified charge combustion to trigger the HCCI combustion. Because auto-ignition is a distributed kinetically-controlled combustion process, the engine operates at a very dilute fuel/air mixture (i.e., lean of a fuel/air stoichiometric point) and has a relatively low peak combustion temperature, thus forming extremely low nitrous oxides (NOx) emissions. The fuel/air mixture for auto-ignition is relatively homogeneous, as compared to the stratified fuel/air combustion mixtures used in diesel engines, and, therefore, the rich zones that form smoke and particulate emissions in diesel engines are substantially eliminated. Because of this very dilute fuel/air mixture, an engine operating in the auto-ignition combustion mode can operate unthrottled to achieve diesel-like fuel economy. The HCCI engine can operate at stoichiometry with substantial amounts of exhaust gas recirculation (EGR) to achieve effective combustion.

There is no direct control of start of combustion for an engine operating in the auto-ignition mode, as the chemical kinetics of the cylinder charge determine the start and course of the combustion. Chemical kinetics are sensitive to temperature and, as such, the controlled auto-ignition combustion process is sensitive to temperature. An important variable affecting the combustion initiation and progress is the effective temperature of the cylinder structure, i.e., temperature of cylinder walls, head, valve, and piston crown. Additionally, spark-assisted ignition is known to facilitate combustion in certain operating ranges.

Operation within an HCCI mode at higher loads can be problematic, as energy present within the combustion chamber increases with increasing load. This increasing energy, exhibited for example by higher temperatures within the air fuel charge being combusted, increases likelihood of the air fuel charge combusting before the intended combustion point, resulting in an undesirable pressure wave or ringing from the combustion chamber.

SUMMARY

A method for controlling combustion in a multi-cylinder spark-ignition direct-injection internal combustion engine includes determining a desired combustion phasing for maintaining acceptable combustion properties, monitoring combustion phasing of each cylinder, selecting a target combustion phasing corresponding to one of the cylinders having a most retarded combustion phasing, adjusting spark timing in each cylinder not having the most retarded combustion phasing to achieve the target combustion phasing to balance the combustion phasing in all the cylinders at the target combustion phasing, and adjusting an external EGR percentage to converge the balanced combustion phasing in all the cylinders toward the desired combustion phasing.

BRIEF DESCRIPTION OF THE DRAWINGS

One or more embodiments will now be described, by way of example, with reference to the accompanying drawings, in which.

DETAILED DESCRIPTION

Figure 1:
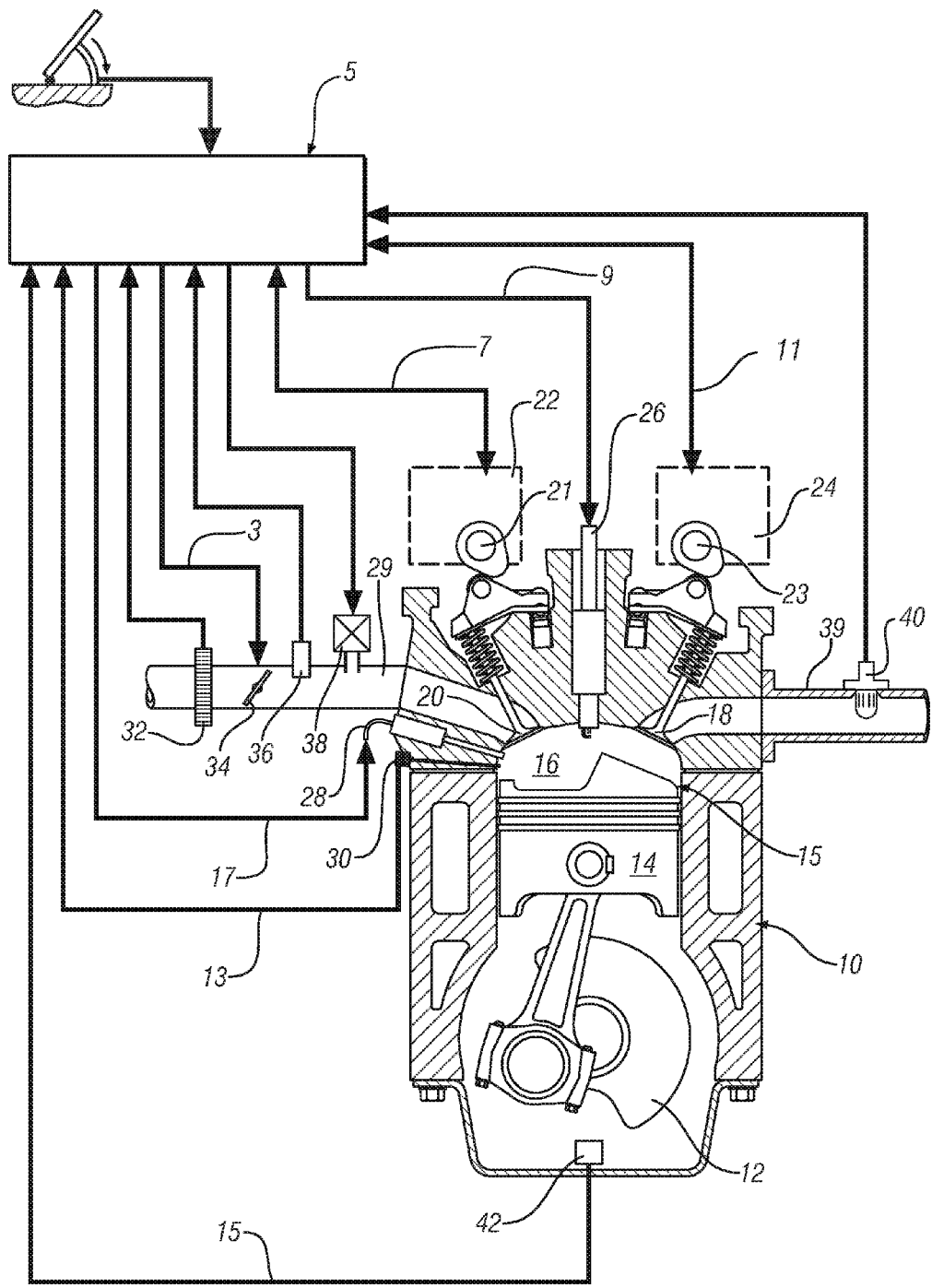
FIG. 1 is a schematic drawing of an exemplary engine system, in accordance with the present disclosure.

Referring now to the drawings, wherein the depictions are for the purpose of illustrating certain exemplary embodiments only and not for the purpose of limiting the same, FIG. 1 schematically shows an exemplary internal combustion engine 10 and an accompanying control module 5 that have been constructed in accordance with an embodiment of the disclosure. The engine 10 is selectively operative in a plurality of combustion modes, including a controlled auto-ignition (HCCI) combustion mode and a homogeneous spark-ignition (SI) combustion mode. The engine 10 is selectively operative at a stoichiometric air/fuel ratio and at an air/fuel ratio that is primarily lean of stoichiometry. It is appreciated that the concepts in the disclosure can be applied to other internal combustion engine systems and combustion cycles.

In one embodiment the engine 10 can be coupled to a transmission device to transmit tractive power to a driveline of a vehicle. The transmission can include a hybrid transmission including torque machines operative to transfer tractive power to a driveline.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system includes airflow ductwork and devices for monitoring and controlling the airflow. The air intake devices preferably include a mass airflow sensor 32 for monitoring mass airflow and intake air temperature. A throttle valve 34 preferably includes an electronically controlled device that is used to control airflow to the engine 10 in response to a control signal (ETC) from the control module 5. A pressure sensor 36 in the intake manifold 29 is configured to monitor manifold absolute pressure and barometric pressure. An external flow passage recirculates exhaust gases from engine exhaust to the intake manifold 29, having a flow control valve referred to as an exhaust gas recirculation (EGR) valve 38. The control module 5 is operative to control mass flow of exhaust gas to the intake manifold 29 by controlling opening of the EGR valve 38.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift of the intake valve(s) 20 and variably adjust and control phasing of the intake camshaft 21 for each cylinder 15 in response to a control signal (INTAKE) from the control module 5. The exhaust VCP/VLC device 24 preferably includes a controllable mechanism operative to variably switch and control valve lift of the exhaust valve(s) 18 and variably adjust and control phasing of the exhaust camshaft 23 for each cylinder 15 in response to a control signal (EXHAUST) from the control module 5.

The intake and exhaust VCP/VLC devices 22 and 24 each preferably includes a controllable two-step variable lift control (VLC) mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for load speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18 respectively. Adjusting the phasing refers to shifting opening times of the intake and exhaust valves) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valves) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, controlled by the control module 5.

The engine 10 includes a fuel injection system, including a plurality of high-pressure fuel injectors 28 each configured to directly inject a mass of fuel into one of the combustion chambers 16 in response to a signal from the control module 5. The fuel injectors 28 are supplied pressurized fuel from a fuel distribution system.

The engine 10 includes a spark-ignition system by which spark energy can be provided to a spark plug 26 for igniting or assisting in igniting cylinder charges in each of the combustion chambers 16 in response to a signal (IGN) from the control module 5.

The engine 10 is equipped with various sensing devices for monitoring engine operation, including a crank sensor 42 having output RPM and operative to monitor crankshaft rotational position, i.e., crank angle and speed, in one embodiment a combustion sensor 30 configured to monitor combustion, and an exhaust gas sensor 40 configured to monitor exhaust gases, typically an air/fuel ratio sensor. The combustion sensor 30 includes a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 is configured to receive input signals from an operator (e.g., via an accelerator pedal and a brake pedal) to determine a torque request (To_req). It will be appreciated that the torque request can be in response to an operator input (e.g., via the accelerator pedal and the brake pedal) or the torque request can be in response to an auto start condition monitored by the control module 5. The control module 5 monitors the sensors indicating the engine speed and intake air temperature, and coolant temperature and other ambient conditions.

The control module 5 executes algorithmic code stored therein to control the aforementioned actuators to form the cylinder charge, including controlling throttle position, spark-ignition timing, fuel injection mass and timing, EGR valve position opening to control flow of recirculated exhaust gases, and intake and/or exhaust valve timing and phasing on engines so equipped. Valve timing and phasing can include NVO and lift of exhaust valve reopening (in an exhaust rebreathing strategy) in one embodiment. The control module 5 can operate to turn the engine 10 on and off during ongoing vehicle operation, and can operate to selectively deactivate a portion of the combustion chambers 15 or a portion of the intake and exhaust valves 20 and 18 through control of fuel and spark and valve deactivation. The control module 5 can control air/fuel ratio based upon feedback from the exhaust gas sensor 40.

During engine operation, the throttle valve 34 is preferably substantially wide-open in the controlled auto-ignition (HCCI) combustion modes, e.g., single and double injection controlled auto-ignition (HCCI) combustion modes, with the engine 10 controlled at a lean air/fuel ratio. Substantially wide-open throttle can include operating fully un-throttled, or slightly throttled to create a vacuum in the intake manifold 29 to affect EGR flow. In one embodiment, in-cylinder EGR mass is controlled to a high dilution rate. The intake and exhaust valves 20 and 18 are in the low-lift valve position and the intake and exhaust lift timing operate with NVO. One or more fuel injection events can be executed during an engine cycle including at least one fuel injection event during a compression phase.

During engine operation in the homogeneous spark-ignition (SI) combustion mode, the throttle valve 34 is controlled to regulate the air flow. The engine 10 is controlled to a stoichiometric air/fuel ratio, and the intake and exhaust valves 20 and 18 are in the high-lift valve open position and the intake and exhaust lift timing operate with a positive valve overlap. Preferably, a fuel injection event is executed during compression phase of an engine cycle, preferably substantially before TDC. Spark ignition is preferably discharged at a predetermined time subsequent to the fuel injection when air charge within the cylinder is substantially homogeneous.

Figure 2:
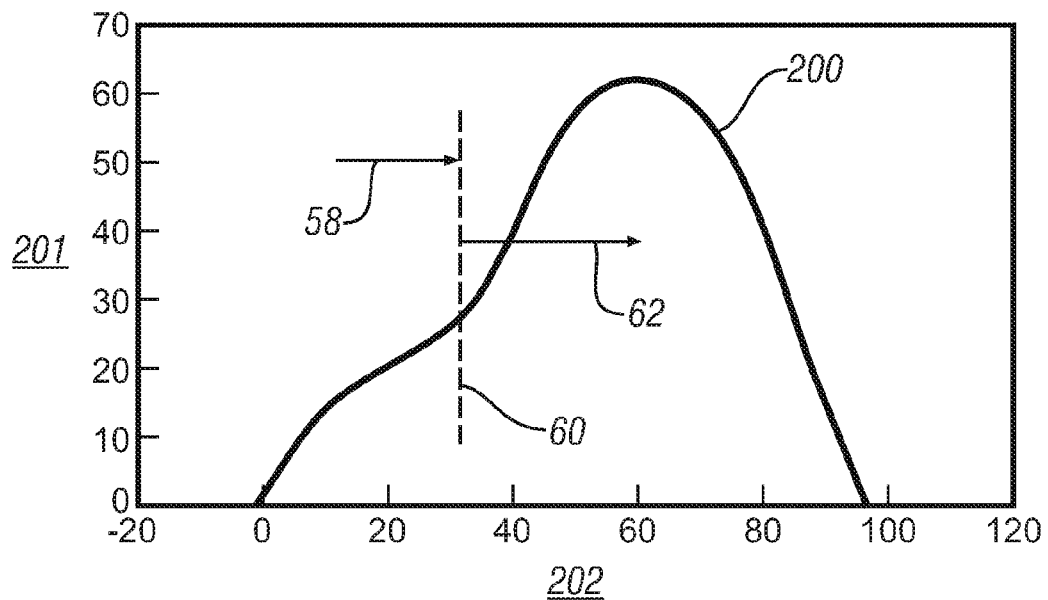
FIG. 2 is a graph depicting a heat release rate profile during spark-assisted HCCI combustion, in accordance with the present disclosure.

Referring to FIG. 2, a graph depicting a heat release rate profile 200 during spark-assisted HCCI (auto-ignition) combustion is illustrated in accordance with the present disclosure. The x-axis 202 represents a Mass Fraction Burn (%) and the y-axis 201 represents the Heat Release Rate (J/deg). The high-load operating limit of controlled auto-ignition (HCCI) can be extended by spark igniting the air fuel charge prior to an auto-ignition point designated by dashed line 60. Spark igniting the air fuel charge initiates flame propagation, wherein flame propagation is utilized to extend the high-load operating limit by retarding auto-ignition and thus achieving acceptable combustion noise. During high-load operation, the spark-assisted auto-ignition includes delivering the fuel mass to the engine using a single injection during an intake stroke, spark-igniting the injected fuel mass during a compression stroke, initiating flame propagation and auto-igniting the remainder of the injected fuel mass when the temperature of the cylinder charge increases by the flame propagation to a temperature sufficient for auto-ignition. Flame propagation occurs up to the dashed line 60 and is denoted by arrow 58. Auto-ignition occurs at the dashed line 60 and is denoted by arrow 62. Subsequent to the single injection during the intake stroke, spark igniting the injected fuel mass during the compression stroke initiating flame propagation can retard auto-ignition to extend the high-load operating limit of controlled auto-ignition combustion. Optionally, spark-assisted auto-ignition can further be configured to include utilizing multiple fuel injections (e.g., a first injection during the intake stroke and a second injection during the compression stroke). As will become apparent, combustion noise of spark-assisted HCCI combustion can be reduced by extending the combustion burn duration and by retarding combustion phasing utilizing spark timing without losing combustion stability.

Figure 3:
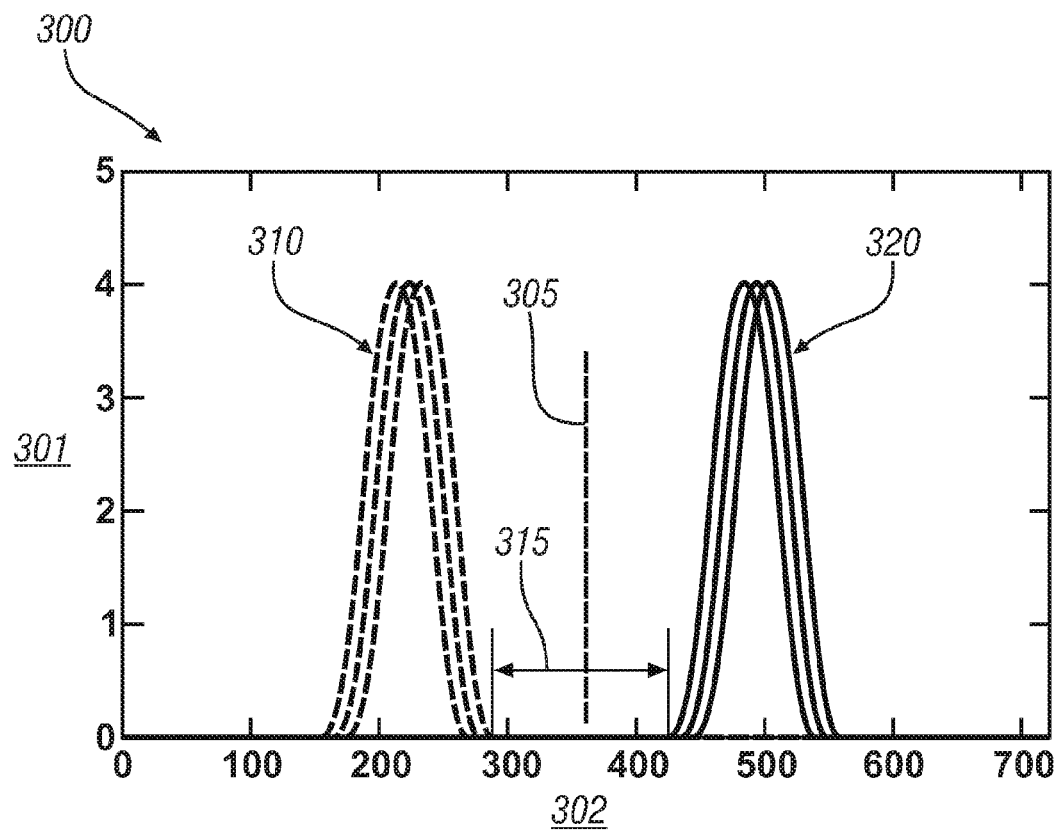
FIG. 3 is a graph depicting an exhaust recompression valve strategy 300 showing an exhaust valve profile 310 and an intake valve profile 320 including a period of negative valve overlap (NVO) 315 is illustrated, in accordance with the present disclosure.

Referring to FIG. 3, a graph depicting an exhaust recompression valve strategy 300 (e.g., exhaust re-breathing strategy) showing an exhaust valve profile 310 and an intake valve profile 320 including a period of negative valve overlap (NVO) 315 is illustrated in accordance with the present disclosure. The x-axis 302 denotes the crank angle location (deg). The y-axis 301 denotes valve profile (mm). Dashed vertical line 305 denotes TDC. As aforementioned, when the engine is operating in the controlled auto-ignition (HCCI) mode including spark-assisted ignition during high-load operation, the maximum load is limited by the amount of mass air flow ($\dot{m}_{air}$) that the engine can breathe. To reduce pumping losses, it is known to operate the engine unthrottled, wherein timings are adjusted for opening and closing the intake and exhaust valves to control the amount of mass air flow and external EGR that the engine can breathe. The amount of external EGR is adjusted utilizing the control module 5 to control mass flow of exhaust gas to the intake manifold 29 by controlling the opening percentage of the EGR valve 38. It is appreciated that adjusting the amount of external EGR has global affects on all of the cylinders. Therefore, the external EGR valve 38 percentage opening can be adjusted to converge balanced combustion phasing in all cylinders toward achieving a desired combustion phasing. The desired combustion phasing is utilized to maintain acceptable combustion properties including combustion noise, combustion stability and combustion efficiency. Balancing combustion phasing in each individual cylinder will be discussed in greater detail below. The amount of external EGR will further be referred to as the external EGR percentage.

The exhaust recompression valve strategy 300 (e.g., exhaust re-breathing strategy) can be utilized to control the amount of mass flow (e.g., mass air flow and external EGR percentage) within the cylinder, wherein hot exhaust gas (i.e., residual gas) from a previous engine cycle is trapped in the cylinder by closing the exhaust valve early during an exhaust stroke and opening the intake valve late symmetrical to the exhaust valve closing timing to breathe mass air flow and external EGR percentage into the cylinder for upcoming combustion during an immediately subsequent cylinder event. The NVO period 315 describes the crank-angle period when both the intake and exhaust valves are closed around the cylinder TDC 305. It is appreciated that cylinder charge temperature, amount of mass air flow and the amount of external EGR percentage depend strongly on the size of the NVO period 315. For instance, a larger NVO period 315 results from an earlier exhaust valve closing timing during the exhaust stroke, wherein a greater amount of the residual gas from the previous engine cycle is trapped within the cylinder. The larger NVO period 315 creates an increased cylinder charge temperature and creates less volume within the cylinder for incoming mass air flow and external EGR percentage to occupy. Therefore, a relationship exists where the available cylinder volume occupied by mass air flow and external EGR percentage is maximized when the NVO period 315 is minimized. When an operator torque request (e.g., via an accelerator pedal and a brake pedal) indicates operating the engine in a high-load homogenous charge compression ignition including spark-assisted ignition, the NVO period 315 can be decreased to increase cylinder volume availability for mass air flow to enter the cylinder and the external EGR percentage can be decreased to maintain an air-fuel ratio based on the operator torque request.

Combustion phasing in each cylinder depends upon the thermal environment within each cylinder when the engine is operating in the controlled auto-ignition (HCCI) mode including spark-assisted ignition during high-load operation. Combustion phasing describes the progression of combustion in a cycle as measured by the crank angle of the cycle. One metric to judge combustion phasing is CA50 or the crank angle at which 50% of the air fuel charge is combusted. Properties of a combustion cycle, such as efficiency, combustion noise and combustion stability, are affected by CA50 of the cycle. Thus, maintaining an optimal/desired combustion phasing is desirable during high load HCCI operation. During a specified injection timing, spark timing and valve timings for a cylinder event, an un-balanced combustion phasing can result in each cylinder due to non-uniform in-cylinder conditions including non-uniform distribution of the external EGR percentage, non-uniform in-cylinder thermal conditions and/or variations from injector-to-injector in each cylinder. Retarding the spark timing to retard the combustion phasing in the cylinder can substantially reduce excessive combustion noise resulting from the non-uniform in-cylinder conditions. As will become apparent, a balanced combustion phasing among individual cylinders can be achieved by adjusting the spark timing in each cylinder to achieve a target combustion phasing and the desired combustion phasing can be achieved by adjusting the external EGR percentage to converge the balanced combustion phasing in all of the cylinders toward the desired combustion phasing. Specifically, the desired combustion phasing can be achieved in a cylinder with less external EGR percentage if the spark timing in the cylinder is retarded.

Embodiments discussed herein utilize a control strategy that balances and controls individual combustion phasing of cylinders while operating the engine in a controlled auto-ignition (HCCI) mode including spark-assisted ignition during high-load operation. The control strategy is not limited to high-load auto-ignition (HCCI) operation and can be similarly applied to low- and medium-load auto-ignition (HCCI) operation.

Embodiments envisioned include determining a desired combustion phasing for maintaining acceptable combustion properties in a controlled auto-ignition mode including spark-assisted ignition. The combustion properties can include combustion noise, combustion efficiency and combustion stability. The combustion phasing in each cylinder is monitored. As aforementioned, the combustion phasing in each cylinder can vary due to non-uniform in-cylinder conditions including non-uniform distribution of external EGR percentage, non-uniform in-cylinder thermal conditions and fuel injector variation. Based on the monitored combustion phasing in each cylinder, a target combustion phasing corresponding to one of the cylinders having a most retarded combustion phasing can be selected. The combustion phasing in each cylinder can be balanced by adjusting the spark timing in each cylinder not having the most retarded spark timing. The adjusted spark timing in each cylinder not having the most retarded combustion phasing can be utilized to achieve the target combustion phasing. Specifically, the combustion phasing can be retarded in the cylinders not having the most retarded combustion phasing by retarding the spark timing in those respective cylinders. Thereafter, the external EGR percentage can be adjusted to converge the balanced combustion phasing of all the cylinders (i.e., target combustion phasing) toward the desired combustion phasing. As aforementioned, adjusting the external EGR percentage has a global affect on all the cylinders and can therefore be utilized to converge combustion phasing when all the cylinders are balanced.

Figure 4:
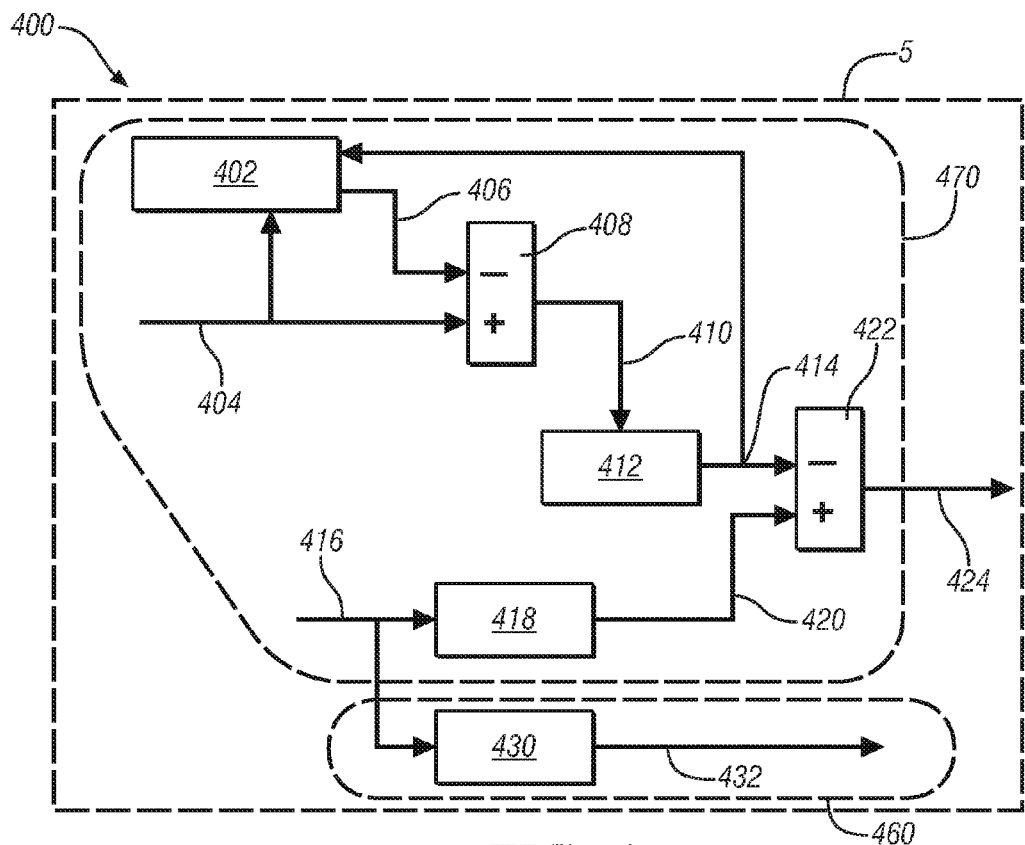
FIG. 4 schematically illustrates a combustion phasing controller 400 for balancing combustion phasing in each cylinder of a multi-cylinder engine and adjusting external EGR percentage converging the balanced combustion phasing in all of the cylinders to converge to a desired combustion phasing, in accordance with the present disclosure.

Referring to FIG. 4, a combustion phasing controller 400 for balancing and controlling individual combustion phasing of individual cylinders while operating the engine in spark-assisted controlled auto-ignition (HCCI) mode is illustrated in accordance with the present disclosure. The combustion phasing controller 400 is associated with the control module 5 and includes a combustion phasing balancing controller 470 and a global combustion phasing controller 460. The combustion phasing balancing controller 470 includes target combustion phasing module (TCPM) 402, a differencing unit 408, an individual integral controller 412, a calibration module 418 and a spark timing adjustment module (STAM) 422. It will be appreciated that combustion phasing can be indicated by CA50, corresponding to the crank angle location aTDC at which 50% of the air fuel charge is combusted. CA50 for each cylinder can be monitored during each engine cycle.

The TCPM 402 selects and generates a target combustion phasing $CA50_T(k)$ 406 during an engine cycle, k. The TCPM 402 can calculate the target combustion phasing ($CA50_T(k)$) 406 using Eq. 1, as follows:

$$CA50_T(k) = \max\{CA50_n(k) | I_n(k) < \epsilon\} \quad [1]$$

wherein
 $CA50_n(k)$ denotes an individual combustion phasing 404,
 n denotes which cylinder is being monitored,
 k denotes the engine cycle,
 $I_n(k)$ is an integrator value corresponding to an amount of spark timing, and
 $\epsilon$ is an adjustable parameter utilized for CA50 balance and bounded for all engine events.

It will be appreciated that the adjustable parameter, $\epsilon$, is a sufficiently small positive number. The individual combustion phasing $CA50_n(k)$ 404 for each cylinder is monitored and input to the TCPM 402 and the differencing unit 408. The target combustion phasing $CA50_T(k)$ 406 selected by the TCPM 402 can correspond to the individual combustion phasing of a cylinder, n, having the most retarded combustion phasing. The TCPM 402 can determine the achievability of the cylinders not having the most retarded combustion phasing to converge their respective individual combustion phasing $CA50_n(k)$ to the target combustion phasing $CA50_T(k)$ through individual spark timing adjustment. $I_n(k)$ represents an integrator value 414 generated by the individual integral controller 412 and input to the STAM 422 and the TCPM 402 utilizing a feedback control loop. The integrator value $I_n(k)$ 414 will be discussed in greater detail below. The target combustion phasing $CA50_T(k)$ 406 is input to the differencing unit 408 and compared with the individual combustion phasing $CA50_n(k)$ 404, wherein a combustion phasing difference 410 is generated for each respective cylinder and input to the individual integral controller 412. The individual integral controller 412 thereby generates the integrator value $I_n(k)$ 414 for each cylinder and is input to the TCPM 402 and the STAM 422. The integrator value $I_n(k)$ 414 directly corresponds to an amount of spark timing in each cylinder not having the most retarded combustion phasing that must be adjusted to achieve the target combustion phasing $CA50_T(k)$ 406. In other words, the integrator value $I_n(k)$ 414 represents an adjustment in the spark timing to each cylinder to minimize the difference between the individual combustion phasing $CA50_n(k)$ 404 and the target combustion phasing $CA50_T(k)$ 406 (i.e., the combustion phasing difference 410). Because the target combustion phasing $CA50_T(k)$ 406 represents the cylinder having the most retarded combustion phasing, the integrator value $I_n(k)$ 414 directly corresponds to the amount the spark timing in each cylinder not having the most retarded spark timing that needs to be retarded for each respective cylinder to achieve the target combustion phasing $CA50_T(k)$ 406 to thereby balance the combustion phasing in all the cylinders. In addition to being input to the TCPM 402 via the feedback control loop, and utilized in a subsequent engine cycle, the integrator value $I_n(k)$ 414 is input to the STAM 422 and adjusted according to unmodified spark timing 420 for each cylinder based on engine parameters 416 input to—and calibrated by—the calibration module 418. The engine parameters 416 can include engine speed and desired injected fuel mass for each engine cycle based on an operator torque request.

The global combustion phasing controller 460 includes an external EGR module 430. The engine parameters 416 are additionally input to the external EGR module 430, wherein the external EGR module generates external EGR adjustments 432 to the external EGR percentage. The external EGR adjustments 432 operate to adjust the external EGR percentage to converge the balanced combustion phasing of the cylinders (i.e., utilizing the combustion phasing balancing controller 470) to achieve a desired combustion phasing. The desired combustion phasing is based on the engine parameters 416 corresponding to the operator torque request, wherein maintaining a desired combustion phasing can achieve acceptable levels of combustion noise, combustion efficiency and combustion stability (i.e., combustion properties). Embodiments envisioned include utilizing the external EGR adjustments 432 to maintain a stoichiometric air fuel ratio utilizing a three-way catalytic converter to meet desired NOx emission levels during high-load operation. For instance, an operator torque request can indicate an increased injected fuel mass where the external EGR percentage can be decreased to achieve an air fuel ratio corresponding to operator torque request. Therefore, the external EGR percentage can be adjusted to converge the balanced combustion phasing of the cylinders associated with the target combustion phasing to achieve the desired combustion phasing.

Figure 5:
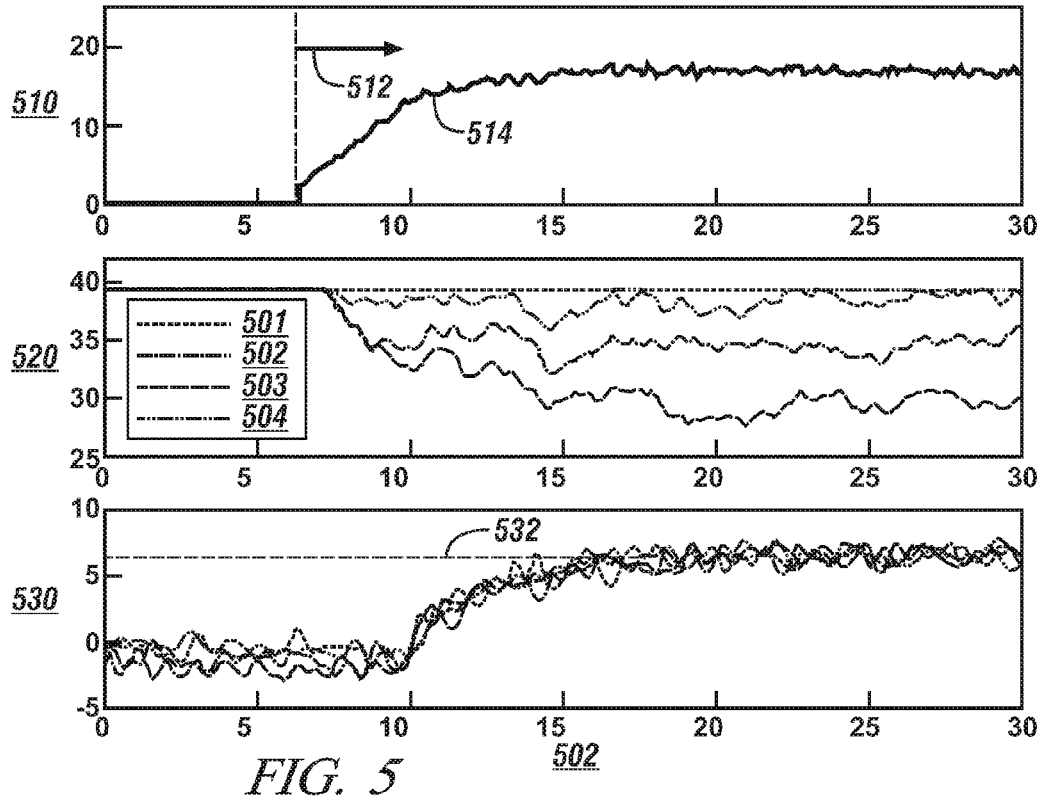
FIG. 5 graphically depicts experimental and derived data from an exemplary engine, depicting an EGR valve opening 510, spark ignition timing 520 and CA50 (i.e., crank angle location of 50% fuel mass burn) 530, in accordance with the present disclosure.

FIG. 5 graphically depicts experimental and derived data from an exemplary engine, depicting an EGR valve opening 510, spark ignition timing 520 (before TDC) and CA50 (i.e., crank angle location of 50% fuel mass burn after TDC) 530 in accordance with the present disclosure. The x-axis denotes time (sec) 502 for plots 510, 520 and 530. The EGR valve opening 510 plot includes the external EGR percentage 514 over time 502. The spark ignition timing 520 plot includes spark timing profile lines 501, 502, 503 and 504 for first, second, third and fourth cylinders, respectively, wherein profile line (e.g., the first cylinder) 501 has the most retarded spark timing and profile line (e.g., the third cylinder) 503 has the least retarded spark timing. CA50 530 plot includes a desired CA50 denoted by dashed line 532 (i.e., desired combustion phasing) and CA50 profile lines 501, 502, 503 and 504 for first, second, third and fourth cylinders, respectively. It is appreciated that the CA 50 profile lines are balanced and converge toward the desired CA50 532 as the external EGR percentage 514 is adjusted.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling combustion in a multi-cylinder spark-ignition direct-injection internal combustion engine, comprising:
  determining a desired combustion phasing for maintaining acceptable combustion properties;
  monitoring combustion phasing of each cylinder;
  selecting a target combustion phasing corresponding to one of the cylinders having a most retarded combustion phasing;
  adjusting spark timing in each cylinder not having the most retarded combustion phasing to achieve the target combustion phasing to balance the combustion phasing in all the cylinders at the target combustion phasing; and
  adjusting an external EGR percentage to converge the balanced combustion phasing in all the cylinders toward the desired combustion phasing.

2. The method of claim 1 wherein the combustion properties comprise combustion noise, combustion efficiency and combustion stability.

3. The method of claim 1 wherein adjusting spark timing in each cylinder not having the most retarded combustion phasing comprises:
  comparing the monitored combustion phasing of each cylinder to the target combustion phasing; and
  determining a respective combustion phasing difference for each respective cylinder based on the comparison; and
  adjusting spark timing in each cylinder not having the most retarded combustion phasing by an amount based on the respective combustion phasing difference.

4. The method of claim 3 wherein the adjusting spark timing in each cylinder not having the most retarded combustion phasing comprises generating a respective integrator value for each cylinder based on the respective combustion phasing difference, the respective integrator value directly corresponding to the amount the spark timing in the corresponding cylinder not having the most retarded combustion phasing must be adjusted to achieve the target combustion phasing.

5. The method of claim 4 wherein the respective integrator value is utilized in a feedback control loop for adjusting spark timing in each cylinder not having the most retarded combustion phasing in an immediately subsequent engine cycle.

6. The method of claim 3 wherein adjusting spark timing in each cylinder not having the most retarded combustion phasing comprises retarding the spark timing in each cylinder not having the most retarded combustion phasing by an amount based on the respective combustion phasing difference for each respective cylinder.

7. The method of claim 1 further comprising monitoring an operator torque request; and
wherein adjusting the external EGR percentage comprises adjusting the external EGR percentage to a value corresponding to the operator torque request.

8. The method of claim 7 wherein adjusting the external EGR percentage to a value corresponding to the operator torque request comprises adjusting the external EGR percentage to maintain a stoichiometric air fuel ratio.

9. The method of claim 7 further comprising:
Increasing an injected fuel mass in response to an increased operator torque request; and
wherein adjusting the external EGR percentage comprises decreasing the external EGR percentage to achieve the value corresponding to the monitored operator torque request.

10. The method of claim 1 wherein selecting the target combustion phasing comprises determining achievability of the cylinders not having the most retarded combustion phasing to converge combustion phasing to the target combustion phasing through individual spark timing adjustment.

11. Method for controlling combustion in a multi-cylinder spark-ignition direct-injection internal combustion engine, comprising:
monitoring an operator torque request;
determining a desired combustion phasing for maintaining acceptable combustion noise and combustion efficiency based on the monitored operator torque request;
monitoring combustion phasing of each cylinder;
selecting a target combustion phasing corresponding to one of the cylinders having a most retarded combustion phasing;
balancing the combustion phasing in all of the cylinders comprising:
comparing the monitored combustion phasing in each cylinder to the target combustion phasing;
determining a combustion phasing difference for each respective cylinder based on the comparing;
retarding a spark timing in each cylinder by an amount based on the respective combustion phasing difference; and
adjusting an external EGR percentage to converge the balanced combustion phasing in all of the cylinders toward the desired combustion phasing.

12. The method of claim 11 further comprising:
operating the engine in a high-load homogeneous charge compression ignition mode including spark-assisted ignition, including, for each cylinder:
delivering an injected fuel mass using a single injection during an intake stroke based on the operator torque request;
spark-igniting the injected fuel mass subsequent to the single injection during a compression stroke effective to initiate flame propagation sufficient to increase temperature of the injected fuel mass to effect auto-ignition.

13. The method of claim 12 wherein spark igniting the injected fuel mass retards auto-ignition to extend the high-load operating limit of controlled auto-ignition combustion.

14. The method of claim 11 further comprising:
utilizing an exhaust recompression strategy including a negative valve overlap period to provide residual heat adequate for controlled auto-ignition.

15. The method of claim 14 wherein monitoring an operator torque request comprises:
operating the engine in a high-load homogenous charge compression ignition mode including spark-assisted ignition based on the operator torque request;
decreasing the negative valve overlap to increase cylinder volume availability for mass air flow to enter each cylinder; and
decreasing the external EGR percentage to maintain an air-fuel ratio based on the operator torque request.

* * * * *